United States Patent
Traversi

[15] 3,654,516
[45] Apr. 4, 1972

[54] CHANGE OF CURRENT OR VOLTAGE ACUTATED PROTECTING RELAY

[72] Inventor: Maurizio Traversi, Pittsburgh, Pa.

[73] Assignee: Westinghouse Electric Corporation, Pittsburgh, Pa.

[22] Filed: Apr. 7, 1971

[21] Appl. No.: 131,990

Related U.S. Application Data

[63] Continuation-in-part of Ser. No. 6,243, Jan. 27, 1970, abandoned.

[52] U.S. Cl. .............................317/27 R, 307/232, 317/38
[51] Int. Cl. ......................................................H02h 3/26
[58] Field of Search.....................317/14 R, 60, 38, 27 R, 46; 307/232; 328/127, 110, 112, 135

[56] References Cited

UNITED STATES PATENTS

3,252,098   5/1966   Schlaepfer.........................328/127 X

*Primary Examiner*—James D. Trammell
*Attorney*—A. T. Stratton, D. R. Lackey and J. L. Stoughton

[57] ABSTRACT

A control device responsive to a change in magnitude and/or phase of an alternating potential sine wave signal in which a first quantity derived by integrating the signal is compared with a second quantity derived by differentiating the signal.

15 Claims, 32 Drawing Figures

DIFFERENCE CURRENT
ALTERNATING COMPONENT
FIG. 5A.

DIFFERENCE CURRENT
D.C. TRANSIENT COMPONENT
FIG. 5E.

INTEGRATOR RESPONSE
TO WAVEFORM 70B
FIG. 5B.

INTEGRATOR RESPONSE
TO WAVEFORM 72
FIG. 5F.

DIFFERENTIATOR RESPONSE
TO WAVEFORM 70B
FIG. 5C.

DIFFERENTIATOR RESPONSE
TO WAVEFORM 72
FIG. 5G.

SUM OF WAVEFORMS 74&76
FIG. 5D.

SUM OF WAVEFORMS 80&82
FIG. 5H.

Patented April 4, 1972

DOUBLE WAVE CLAMPING    FIG. 9E.

FULL WAVE RECTIFICATION

CHANGE OF CURRENT OR VOLTAGE ACUTATED PROTECTING RELAY

This application is a continuation-in-part of my prior filed copending application Ser. No. 6,243 filed Jan. 27, 1970 for Current Actuated Protecting Relay, now abandoned.

BRIEF SUMMARY OF THE INVENTION

In certain power system configurations faults may occur which result only in small changes of the steady-state current and which fault current may be less than the non-fault current. These faults cannot be detected by present equipment resulting in the protective relaying system failing to respond to the fault. A signal change relay in accordance with this invention performs fast detection of faults by means of comparing the integral with the derivative of the alternating current signal. The circuit also rejects the effects of noise, harmonic content and under frequency operation of the power supply.

BRIEF DESCRIPTION OF THE DRAWINGS

For a better understanding of the invention, reference may be had to the exemplary embodiment shown in the accompanying drawings, in which.

DETAILED DESCRIPTION OF THE INVENTION

Figure 1:
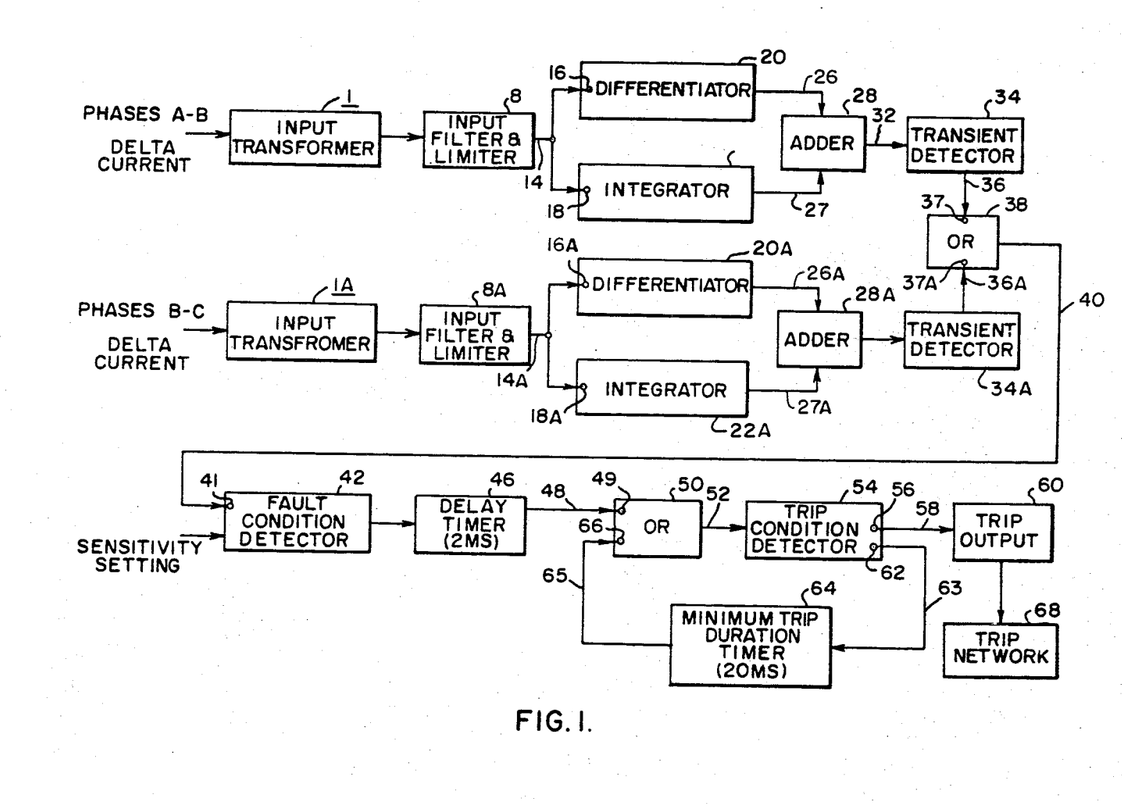
FIG. 1 is a block diagram showing a current change relay protection scheme for three-phase power embodying the invention.

Referring to the drawings by characters of reference, the numeral 1 indicates a current to voltage transducer which may take the form of a transformer having an iron core with an air gap, and primary and secondary windings 3 and 4. As illustrated the protecting relay is designed for protecting a three-phase power line with a minimum quantity of circuitry. For this reason the primary winding 3 of the input transformer 1 is connected, in a manner obvious to those skilled in the art, to be energized with a signal which is the vector sum of the current flowing in phase conductors A and B of the power source and a second input transformer 1A, identical to the input transformer 1, has its primary winding energized with a signal which is the vector sum of the current flowing in the phase conductors B and C. As an example, the primary winding 3 could be connected in series with the secondary windings of two current transformers with the first thereof having its primary winding conducting the current of phase A and the second thereof having its primary winding conducting the current of phase B.

The secondary winding 4 of the input transformer 1 is connected to energize the low pass input filter 8 of a construction suitable to eliminate or at least substantially attenuate the high frequency noise and harmonic content of the waveform supplied thereto. This filter is shown as including two cascaded RC ladder cells 10 and 11. A pair of back to back arranged Zener diodes 12 are connected across the output conductors 14 and 15 of the input filter 8 and prevent an excessive voltage therebetween.

The conductors 14 and 15 are connected to the input terminals 16–17 and 18–19 of a differentiator network 20 and an integrator network 22, respectively. The differentiated output signal of the differentiator 20 and the integrated output signal of the integrator 22 appear between a common bus 24 and the conductors 26 and 27 which connect these networks 20 and 22 to an adder 28. The adder may comprise a pair of fixed value resistors and a potentiometer 30 connected in series. The movable arm of the potentiometer 30 is connected by a conductor 31 to an input terminal 32 of a transient detector 34 which has its output terminal connected by the conductor 36 to a first input terminal 37 of an analog OR network 38 and will supply substantially a zero signal to the network 38 when a steady state sinusoidal signal is supplied by the transformer 1.

Figure 2:
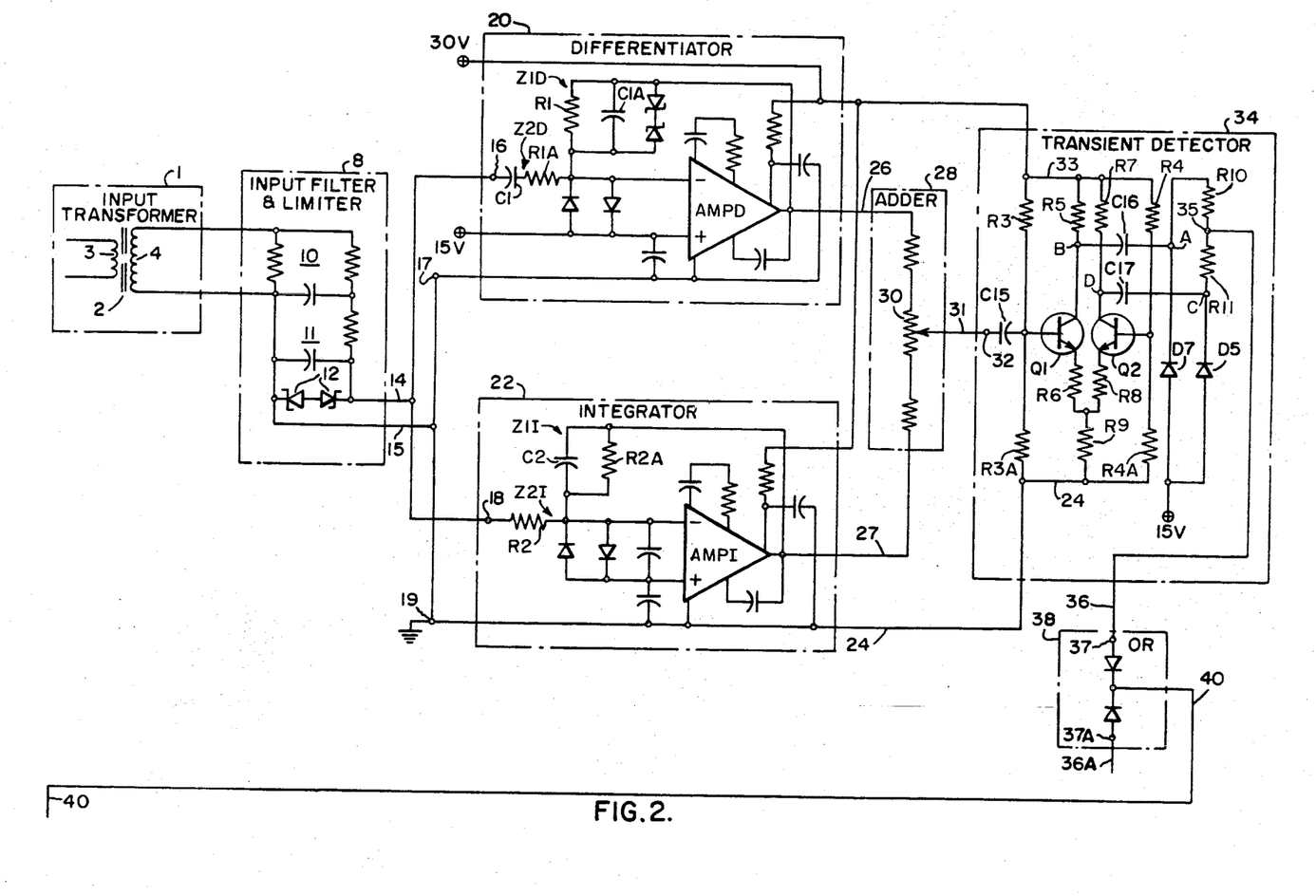
FIGS. 2 and 3 show diagrammatically circuitry which can be used in the blocks of FIG. 1.

The transient detector 34 comprises a differential pair of transistors Q1 and Q2 connected between a positive 30 volt bus 33 and the ground bus 24. The collectors of these transistors are connected to bus 33 through resistors R5 and R7 respectively and the emitters are connected through resistors R6 and R8, respectively, and a common resistor R9 to the bus 24. Resistors R10 and R11 are connected in series to provide a summing mode at the common output connection 35 or terminal to which the output bus 36 is connected. The free ends of the resistors R10 and R11 are connected through diodes D7 and D5 respectively to a 15 volt positive terminal. A capacitor C16 is connected between points A and B and a capacitor C17 is connected between points C and D. The magnitudes of the resistance of the resistors R6 and R8 may be in the order of 750 ohms which is preferably much less than that of resistor R9 which may be in the order of 3,300 ohms. The resistance of the resistors R5 and R7 may be in the order of 6,100 ohms which is considerably greater than that of the resistor R9. The input terminal 32 is coupled to the base of transistor Q1 through a coupling or DC blocking capacitor C15 so that only changes in potential as contrasted to steady-state conditions will actuate the detector 34.

Figures 7, 9A, 9C, 9D:
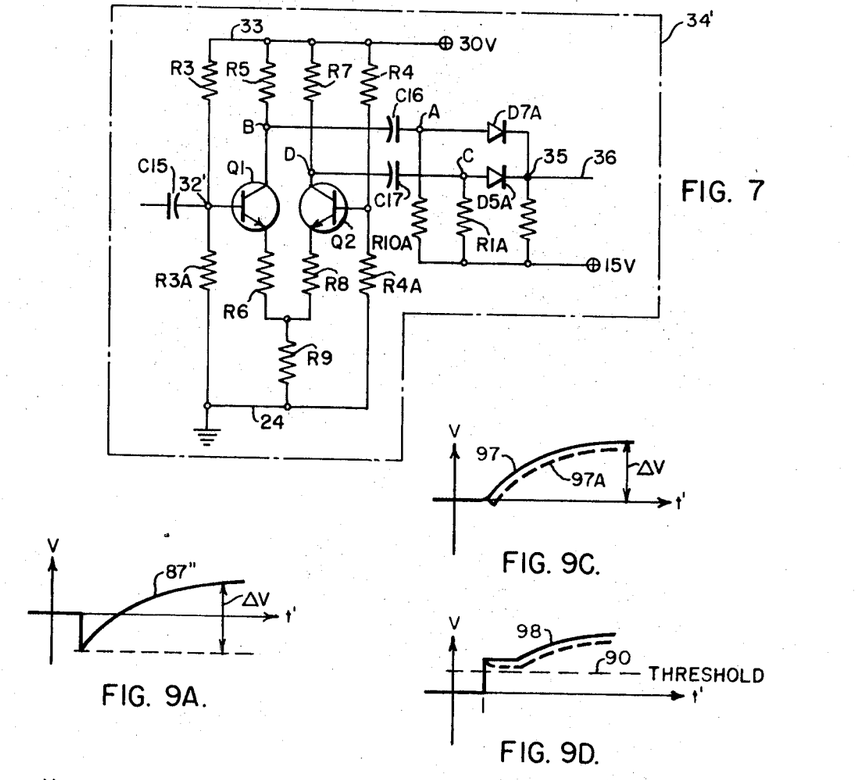
FIG. 7 is a schematic diagram of a modified circuit which may be used in detector networks.
FIGS. 9A–9E illustrate by means of curves certain operating features of the invention when the detector network is in accordance with FIG. 2.
Figure 8A:
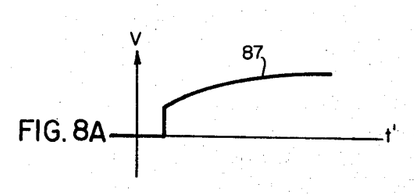
FIGS. 8A–8L illustrate by means of curves certain operating features of the invention when the detector network is in accordance with FIG. 7.
Figure 8B:
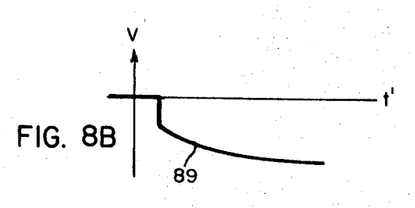
Figure 8C:
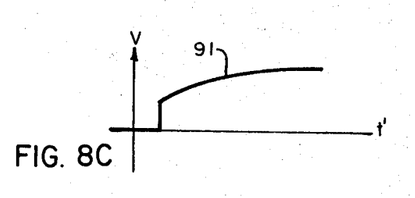
Figure 8D:
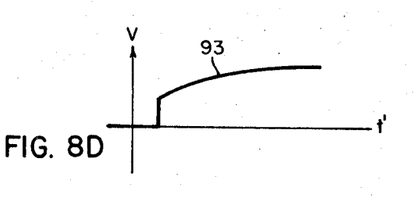
Figure 8E:
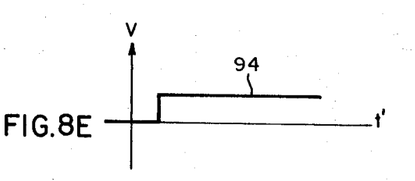
Figure 8F:
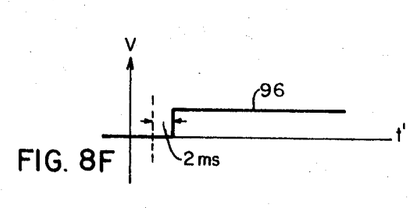
Figure 8G:
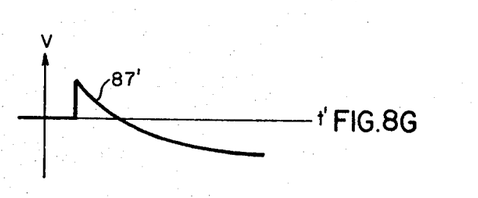
Figure 8H:
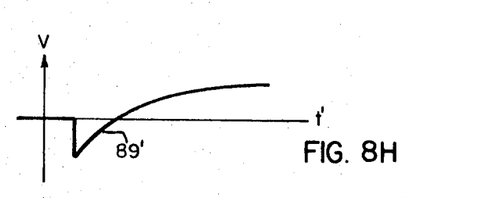
Figure 8I:
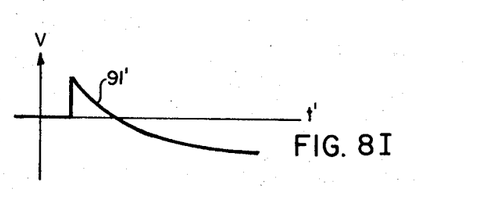
Figures 8J, 8K, 8L:
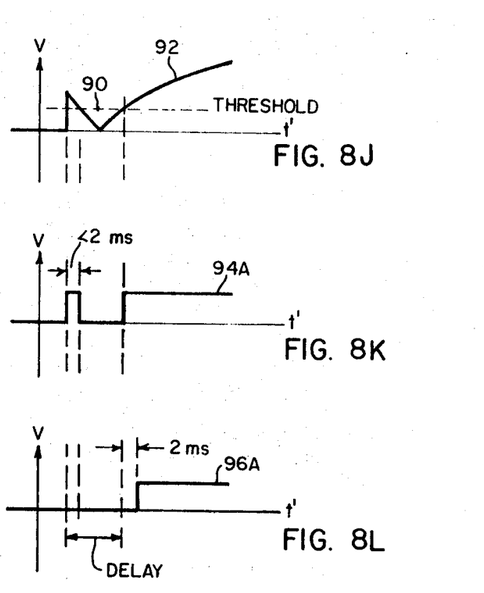
Figure 9B:
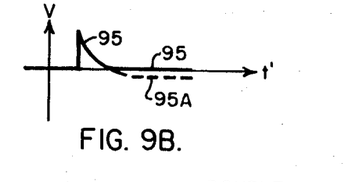
Figure 9E:
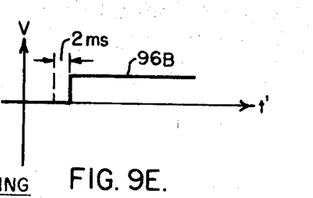

The detector 34' of FIG. 7 provides full wave rectification and while not necessarily preferred over the detector 34 is quite satisfactory in its performance. Like parts of the detector 34' to those of detectors 34 are identified by the same reference characters where possible. The chief difference between the detectors 34 and 34' is in the manner in which the diodes D5A and D7A and resistors R10A and R11A are connected between the plus 15 volt terminal and the output connections 35.

The second sensing means, comprising the input transformer 1A, is connected to be energized by the vector sum of the current in phases B and C. The output of the transformer 1A is supplied through an input filter 8A to the input terminals 16A and 17A of a second differentiator 20A and to the input terminals 18A and 19A of a second integrator 22A. The output quantities of the differentiator 20A and integrator 22A are supplied by conductors 26A and 27A to the adder network 28A which is connected through a transient detector 34A identical to detector 34 to the second input terminal 37A of the analog OR network 38 to provide a signal thereto as described above in connection with the signal supplied to the input terminal 37 from the adder 28.

The output terminal 39 of the OR network 38 is connected by conductor 40 to the first input terminal 41 of a fault condition detector 42. The detector 42 includes a fault level sensing adjuster comprising a potentiometer 44 having a movable arm which determines the level of the input signal thereto which is necessary to actuate a delay timer 46. The timer 46 prevents false operation due to short term transients. A suitable timing interval would be 2 milliseconds.

The delay timer 46 is connected by conductor 48 to a first input terminal 49 of a second OR network 50. The output of the OR network 50 is connected by a conductor 52 to the input of a trip condition detector 54. A first output terminal 56 of the detector 54 is connected by a conductor 58 to the input terminal of a trip controlling output circuit 60. A second output terminal 62 of the detector 54 is connected by a conductor 63 to the input terminal of a minimum trip duration timing circuit or network 64. The output terminal of the timer 64 is connected by a conductor 65 to the second input terminal 66 of the OR network 50.

With this arrangement of timing circuits 46 and 64 the fault condition must be present for a predetermined time interval, which, as indicated, may be 2 milliseconds, before energization of the trip detector 54 and the resulting energization of trip output circuit 60 and of the trip network 68. The trip detector 54 also actuates the timer 64 which will maintain the second input terminal 66 of the OR network 50 energized for a predetermined time interval after any termination of the deenergization of the terminal 48. This interval is indicated as being 20 milliseconds and ensures that when once actuated the trip output circuit 60 will be maintained energized for a time period sufficient to operate the trip network 68.

Figure 4:
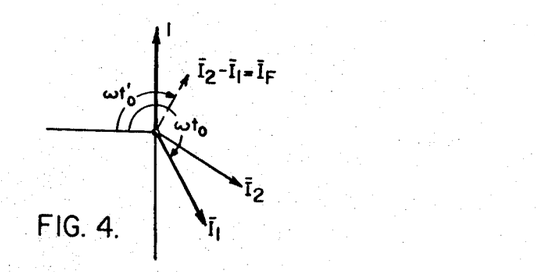
FIG. 4 is a phasor diagram illustrating the magnitudes and phase of AC quantities which may be present after a fault occurs.

It is believed that the invention may be best understood by a description of operation of the apparatus. The phasor $I_1$ (FIG. 4) indicates the phase angle and magnitude of a normal current to the load device (not shown) from a source being protected by the current change relay and at an instant just prior to time $t'_0$. The phasor $I_2$ indicates the magnitude and phase angle of the resulting steady state AC current which will exist after the fault. The phasor $I_F$ represents the phase and magnitude of the change in current from the current $I_1$ to $I_2$ or current $I_F$ and which will be hereinafter sometimes referred to as the fault or added current. The current $I_1$ will sometimes be referred to as the initial current and the current $I_2$ will sometimes be referred to as the resulting or final current. The rotation of the phasors is clockwise and phasor I is a base indicator.

Figures 5A, 5E:
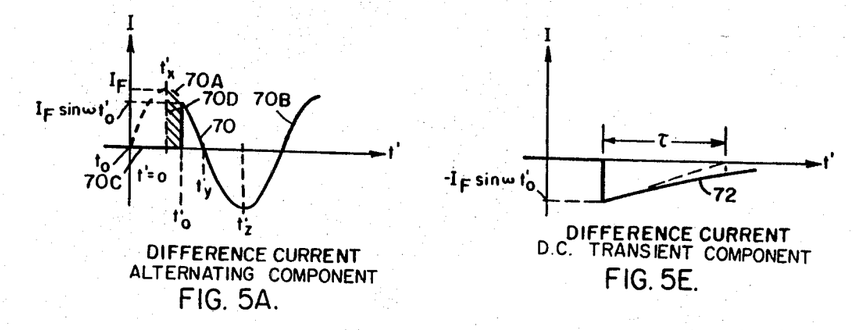
FIGS. 5A–5H illustrate by means of curves the operation of the current change relay scheme.

The dotted line portion 70A of the wave 70 shows the sinusoidal waveform of the fault current $I_F$ which if present would flow in the circuit but which current is not actually present until the time $t'_0$ at which time the fault occurs. The solid line portion 70B of the wave 70 illustrates the alternating component of the fault current after the fault. Since the fault current cannot immediately change from a zero value 70C to the value $I_F \sin\omega t'_0$, there is present a DC transient component as illustrated by the curve 72. Initially this component is equal and opposite the magnitude $I_F \sin\omega t'_0$ and decays exponentially as the transient subsides.

The voltage $V_F$ is directly proportional to the current $I_F$ and the magnitude of this proportionality factor $K_x$ is determined by the turns ratio of the transformer 1 and of the magnitude of the components of the cell 10. For simplicity this ratio factor $K_x$ has been considered as being unity. If it were other than unity both terms $-\omega K_2 V_F \cos\omega t$ and $\omega K_2 V_F \cos\omega t$ would be multiplied by this same ratio factor $K_x$.

Figure 5B:
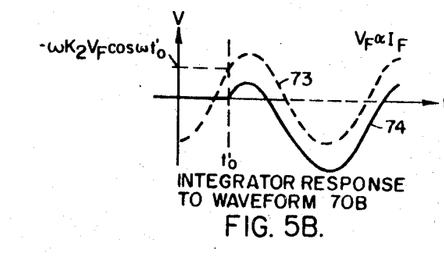

The curve 74 represents the wave shape of and the magnitude of the output quantity of the integrator 22 and is a weighed magnitude of the integral function of the sine wave $I_F \sin\omega t$.

Figure 5C:
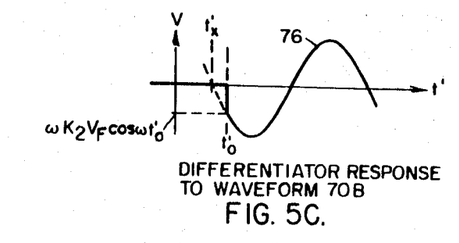

The curve 76 represents the wave shape of and the magnitude of the output quantity of the differentiator 20 and is a weighed magnitude of the differential function of the sine wave $I_F \sin\omega t$. As illustrated, the time of fault was arbitrarily chosen as the time $t'_0$. As will become apparent from the discussion below this will provide an offset between the waves 74 and 76 to provide from an output quantity 78 as well as a difference current 72 to provide the quantity 84.

Figure 5D:
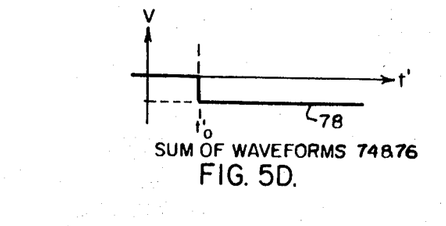

The magnitude of the displacement of the curve 78 is $-\omega K_2 V_F \cos\omega t'_0$ and remains constant. The wave 74 would maintain its symmetry about its zero axis for all values of $\cos\omega t$, if the fault occurred at the time $t'_x$ (the 90° point on wave 70) since the value of $\cos\omega t'_x$ would have been zero. This condition is illustrated by the wave 73 which is shown as being symmetrical about the illustrated axis. The sum of the waves 73 and 76 balance each other and the curve 78 would remain on the zero axis. This is the same condition of balance which would exist prior to the time of fault by the steady state sine wave of the current in the power line due to the time of the normal or initial current flow I. As will be discussed below, under steady-state conditions the curve 84 remains along the illustrated axis and the transient detector 34 would remain unactuated.

The derivative of a sine wave function $V_F \sin\omega t$ is equal to $\omega V_F \cos\omega t$ while the integral of the same sine function is equal to $[-1/\omega] \cos\omega t$. As indicated in FIGS. 5B, 5C and 5D, the waves 73 and 76 at any given time are of equal and opposite magnitude as well as are the alternating components of the wave 74 and 76 as indicated in FIG. 5D. The magnitude of the constants $K'$ and $K''$ by which the integral $[-1/\omega] V_F \cos\omega t$ and the differential $\omega V_F \cos\omega t$ are to be multiplied to obtain the formulas for the curves 73 and 76 is readily mathematically determined by multiplying the integral $[-1/\omega] V_F \cos\omega t$ by the constant $K'$ and multiplying the derivative $\omega V_F \cos\omega t$ by the constant $K''$ and equating the products to provide the following equation.

$$[1/\omega] K' V_F \cos\omega t = K'' \omega V_F \cos\omega t \quad (1)$$

As indicated in FIg. 5C $$K'' \omega V_F \cos\omega t = \omega K_2 V_F \cos\omega t \quad (2)$$

therefore $$K'' = K_2 \quad (3)$$

and $$[1/\omega] K' V_F \cos\omega t = \omega K_2 V_F \cos\omega t \quad (4)$$

by reducing equations (4) the ratio of the values of $K'$ and $K_2$ is obtained as $$K' = \omega^2 K_2 \quad (5)$$

When the value of $K'$ in equation (5) is substituted in equation (4), the integral, reduces to $-\omega K_2 \cos\omega t$ as is shown in FIG. 5B.

The differentiator and integrator networks 20 and 22, preferably take the form of computing networks or operational amplifiers. These networks include respectively a high gain amplifier AMPD and AMPI, a feedback impedance network Z1D and Z1I and an input impedance network Z2D and Z2I. The network Z1D includes a resistor R1 in shunt with a capacitor C1A and is primarily resistive in nature, when considered with respect to the frequency of the input signal to the transformer 1. The network C2D includes a capacitor C1 and a resistor R1A and is primarily capacitive in nature. The combined result of the capacitor C1A and of the resistor R1A is to limit the gain at high frequency and thereby render the differentiator less sensitive to noise. The network Z1I includes a capacitor C2 shunted by a resistor R2A and is primarily capacitive in nature when considered with respect to the frequency of the input signal to the transformer 1. The network Z2I comprises the resistor R2.

As is well known to those skilled in the art, the ratio between the output voltage Vo and the input voltage Vi of an operational amplifier is the negative of the ratio of the feedback impedance to the input impedance. As such, the output voltage may be stated by the expression $(-Z1D)$ Vi/Z2D in the case of the differentiator and by the expression $-(Z1I)Vi/ZI$ in the case of the integrator. Assuming $VI = V_{max} \sin\omega t$ and the normal frequency of the line with which the apparatus is to be associated is the usual 60 hertz whereby C1A, R1A and R2A may be neglected, the above ratio $-(Z1D)Vi/ZD$ reduces to $-j\omega$ R1C1Vi and $-\omega R1C1V_{max} \cos\omega t$. The ratio $-(Z1I)Vi/Z2I$ reduces to $jVi/\omega$ R2C2 and $V_{max} \cos\omega t/\omega R2C2$. When the two output voltages Vo are set equal and of opposite sign to each other so that the sum thereof is equal to 0, the resulting equation reduces to $$R1R2C1C2 = 1/\omega^2$$

Therefore the product of the feedback resistance R1 in ohms of the differentiator, the input resistance R2 in ohms of the integrator, of the input capacitor C1 in farads of the differentiator, and of the feedback capacitor C2 of the integrator in farads should equal $1/\omega^2$ where $\omega$ is the angular frequency of the alternating potential input signal.

The assumed time of the fault was chosen at time $t'_0$ to more readily permit the discussion of the effect of the difference current component which will have an initial magnitude of $-I_F \sin\omega t'_0$ as indicated in FIG. 5E. As will now be apparent this initial magnitude will vary in accordance with the sine term to provide the maximum initial magnitude when the curve 78 is not displaced from the initial magnitude.

The output of the adder will also reflect the integrated and differentiated quantity of the difference current illustrated in FIG. 5E. The initial magnitude of the difference current is equal to $-I_F \sin \omega t'_o$. This is the magnitude of the initial DC transient which will decay to a small magnitude as illustrated in FIG. 5E, during a time interval $\tau$ (which depends on the impedance of the network, as is well known).

Figure 5F:
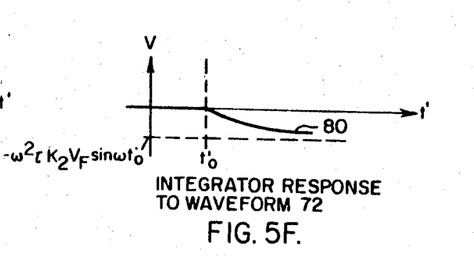

The DC transient component of magnitude $I_F \sin \omega t'_o$ decays exponentially at a rate as determined by $\phi-(t/\tau)$ as is well recognized in the art. When the difference current $I_F \sin \omega t'_o \phi-(t/\tau)$ is integrated over a very long period of time its magnitude reaches the value $-\omega^2 \tau K_2 I_F \sin \omega t'_o$. As indicated above the ratio $K_x$ between $I_F$ and $V_F$ has for simplicity been choosen as unity so that the value $-\omega^2 \tau K_2 I_F \sin \omega t'_o$ becomes the value $-\omega^2 \tau K_2 V_F \sin \omega t'_o$ as indicated in FIG. 5F.

Figure 5G:
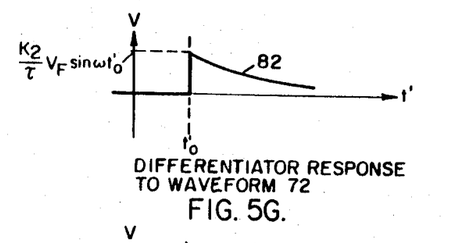
Figure 5H:
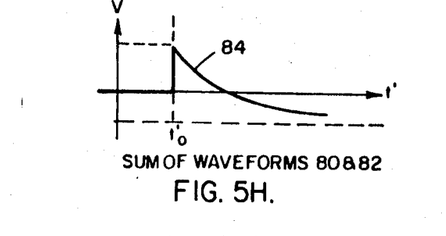

Similarly the differential of the current $I_F \sin \omega t'_o \phi-(t/\tau)$ reduces to $1/\tau(K_2 V_F \sin \omega t'_o)$ and is represented by curve 82 in FIG. 5G. Curve 84 of FIG. 5H represents the algebraic sum of the curves 80 and 82. It will now be appreciated that the difference current is a maximum at $\sin \omega t = 1$ and the DC displacement 78 of the curves 74 and 76 is zero. At $\cos \omega t = 0$ the reverse is true with the DC displacement 78 being zero. At intermediate values of $\omega t$ the magnitudes represented by curves 78 and 84 both contribute to the input signal to the detector 34.

The curves $84_1-84_4$ (FIGS. 6A and of 6B) qualitatively represent the change in magnitude of the sum of the curves 80 and 82 under various fault conditions. The initiating magnitudes 86' and 86'' represent different values of the initial quantities represented by the curves 78 and 84 and graphically show the algebraic sum of the magnitudes of these curves during an ensuing time period.

The curves of FIGS. 8A-8F represent a set of output quantities which may be obtained from the transient detector 34' with a fault signal as shown by curve $86'-84_1$ of FIG. 6 while the curves of FIGS. 8G-8L represent a set of quantities which may be obtained with the same detector but with the fault signal as shown by curve $86'-84_4$. FIGS. 9A-9E represent a set of quantities which may be obtained from the transient detector 34 with the fault signal $86'-84_4$.

Curve 87 represents the voltage signal applied to input terminal 32' under a fault condition which provides an initial positive signal 86' and a subsequent signal $84_1$ wherein the signal is continually of positive polarity. This signal causes the transistor Q1 to increase in conduction and the transistor Q2 to decrease in conduction (FIG. 7). When this occurs the potential of the points B and D follow the curves 89 and 91 respectively. The increase in potential at point D causes the potential at point C to rise and the reduction of potential at point B causes a decrease in potential at point A to decrease. The diode D7A becomes back biased and the diode D5A conducts to cause an increase in potential at the output terminal 35 to increase in potential as illustrated by curve 93. This increase in potential is supplied through the OR network 38 to the fault detector 42. The input terminal 41 is coupled to the base of transistor Q3 through a capacitor C18 to block the effect of the 15 volt DC potential and to cause transistor Q3 to respond to changes in potential supplied to the terminal 41. The resulting increase in potential at terminal 41 causes the transistor Q3 to reduce its conduction. When the resulting positive signal at the base of transistor Q5 exceeds that established by the potentiometer 44 on the base of transistor Q4 (threshold 90) transistor Q5 conducts. This results in diode D9 becoming blocked and base current for transistor Q7 flowing through diode D11 whereby transistor Q7 conducts and transistor Q8 becomes blocked and timing capacitor C19 starts to discharge through resistor R12 to provide its 2 ms timing interval. The time during which the transistor Q8 is nonconducting to permit the discharge of capacitor C18 is indicated by the raised portion of line 94. At the end of the 2 milliseconds timing interval a trip signal 96 is applied to the OR network 50. It will be appreciated that a similar condition would result if the fault produced the curve $86''-84_1$ of FIG. 6B. In this event, the curves 87, 89 and 93 would be of opposite polarity, curves 93 would remain the same polarity but curve 93 would result from the conduction of diode D7A and the back biasing of diode D5A.

Figure 6A:
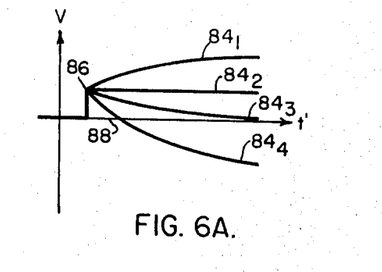
FIGS. 6A and 6B illustrate qualitatively certain output quantities which may be derived from the differentiating and integrating operation.
Figure 6B:
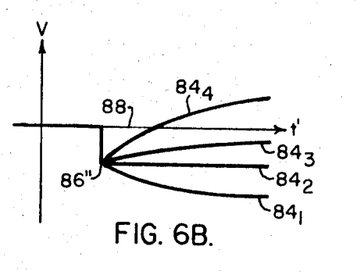

A somewhat different operation results with the use of the transient detector 34' when the fault provides the signal as illustrated by $86'-84_4$ of FIG. 6A. The input signal under this condition is represented by the curve 87', the potential at points B and D is represented by the curves 89' and 91' with the potential at the output terminal being represented by the curve 92. The magnitude of the initial portion of the curve 92 exceeds the threshold value 90 with the result that the capacity C19 of the delay timer 46 starts to discharge and time out its 2 milliseconds time interval. The curve 92 (which represents the most unfavorable fault occurrence) however in less than the 2 milliseconds timing interval decreases below the threshold magnitude 90 and the timer resets almost instantaneously as indicated by the initial raised portion of the curve 94A. This resetting occurs as a result of the rapid recharging of capacitor C19 through the transistor Q8. It is prevented from charging to a voltage which exceeds a voltage substantially greater than that of the plus 15 volt supply by the diode D12. At a somewhat later time the curve 92 again exceeds the threshold value 90 and the timer restarts its timing interval as indicated by the second raised portion of the curve 94A. At the end of the 2 milliseconds timing interval the trip signal 96A is provided.

A still different operation results when the transient detector 34 is utilized because of the double wave clamping effect. This difference is most pronounced when applied to a fault which change the polarity of the potential of wave $(86''-84_4)$ to provide curve 87'' of FIG. 9A. It does not result in an initial "false" actuation of the timer 46. When the signal 87'' is initially applied, the transistor Q1 decreases its conduction and the transistor Q2 increases it conduction (FIG. 2). The curve 95 represents the change in potential of point A and the curve 97 represents the ideal plot of the change in potential of point C and which would occur if the diode D5 had no forward potential drop while curve 97A illustrates qualitatively this forward drop. The initial decrease in conduction of transistor Q1 causes point B to increase in potential and since the capacitor C16 does not change its charge instantaneously, the point A increases in potential (curve 95). The increase in conduction of the transistor Q2 results in a small initial decrease in potential of point C, curve 97A. Since resistors R10 and R11 are of equal value, the resulting current flow from point A to point C will cause the output potential at terminal 35 to decrease to one half of the difference between the potentials of points A and C. As soon as the point C, as illustrated by curve 97A, drops below the forward drop of the diode D5, the diode D5 conducts and prevents the point C from decreasing to a potential which is lower than the potential of the 15V bus by more than the forward drop of the diode D5.

The error signal 87'' supplied to the base of the transistor Q1, rapidly becomes less negative and the transistor Q1 reduces its conduction and thereby the potential of points A and B, as illustrated by the down slope of the curve 95. At the same time the transistor Q2 is decreasing its conduction and the point C rises an illustrated by curve 97A. Ideally the potential of point A would not fall below the 15 volt potential as indicated by curve 95, however, the point A will fall below the 15 volt potential by the magnitude of the forward drop of the diode D7 as shown by curve 95A.

Curve 98 represents the potential at the output terminal 35 and represents one half of the sum of the potentials of curves 95 and 97A and subsequently one half of the sum of curves 95A and 97A. It will be apparent from curve 98 and threshold curve 90 that the timer 46 will be initiated to time out its 2 ms interval substantially simultaneously with the application of the error signal as indicated by curve 96B.

Prior to the timing out of the timer 46, transistor Q9 (FIG. 3) is maintained in conduction by the network comprising the resistors R19, R20, R21 and diode D14. As long as the diode D14 is conducting resistors R19 and R20 are in parallel. The magnitude of the resistance of resistor R19 is preferably one-quarter of that of the resistor R20 and the magnitude of the resistance of the resistor R21 is preferably one-half that of the resistor R20. With this relationship the voltage at the base of transistor Q9 is approximately 10.7 volts. When the voltage on the capacitor C19 reduces the potential of the conductor 48 to approximately 10 volts diode D13 starts conducting and connects the capacitor C19 to the biasing network of transistor Q9. The current flowing through resistor R19 now flows through both the diode D13 and the diode D14 reducing the rate of discharge of the capacitor C19 but letting the voltage at the base of the transistor Q9 decrease at a rate determined by the discharge of the capacitor C19. The resulting reduction in the conduction of the transistor Q9 causes the potential of the base of the transistor Q10 to increase. The time interval of this is approximately 2 milliseconds after the transistor Q8 is turned off. This increase in the potential of the base of the transistor Q10 causes it to conduct and the transistor Q9 switches off. The turn off of the transistor Q9 increases the voltage supplied to the base of the transistor Q11 which thereupon terminates its conduction permitting the capacitor C20 of the timer 64 to charge up to 15 volts through the resistors R19, R22, R29 and R30 and the diode D15. Because of the relative magnitudes of the resistors of the series combination R19 and R20 and the parallel combination of resistors R19 and R22 the voltage across the resistor R22 rises abruptly to about 12 volts which thereupon terminates further conduction of the diodes D13 and D14 and causing the base of the transistor Q9 to be biased at approximately plus 5 volts by the network comprising the resistors R20 and R21 permitting the capacitor C19 to discharge through the resistor R12 only. Two different situations may now develop (1) the transistor Q8 may remain off and (2) the transistor Q8 may be turned on.

Figure 3:
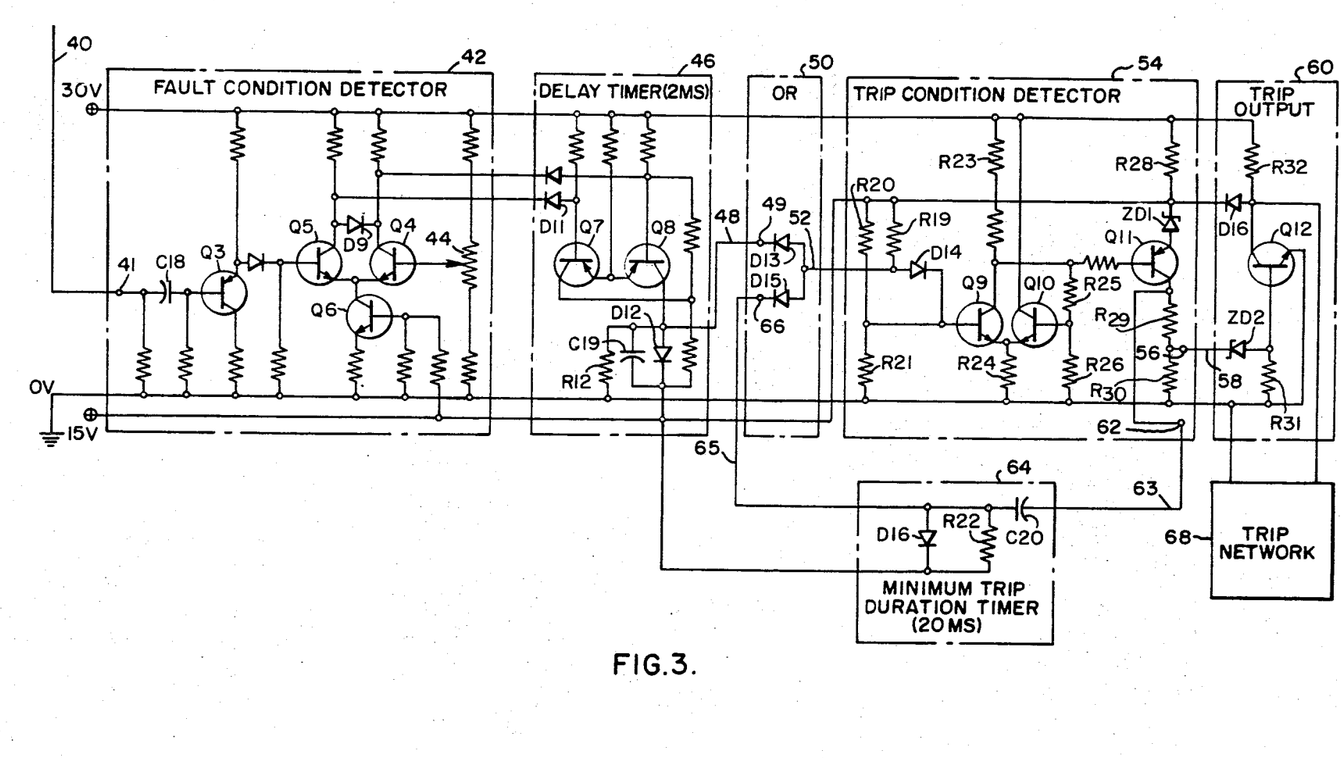

Assuming first that the transistor Q8 remains off because the transient error signal applied to the base of the transistor Q5 remains above the voltage applied at the base of the transistor Q4 by potentiometer 44. A steady state condition is now reached in which both the diodes D13 and D14 are again forward biased. Diode D15 is reverse biased and capacitor C20 charges completely to the plus 15 volt magnitude. The resulting addition of the network comprising the resistors R12, R19, R20 and R21 and the diodes D13 and D14 only raises the voltage at the base of the transistor Q9 from about its original 5 volts to about 5.4 volts. This condition in which the transistor Q10 is turned on and the transistor Q9 is turned off will last until the transistor Q8 is turned on and charging capacitor C19 back again to the full charge. Diode D13 is now back biased and the system goes back to its initial state with the transistor Q9 conducting and the transistor Q10 blocked.

If the forward condition subsides less than 22 milliseconds after the transistor Q8 has been turned off and the transistor is again turned on, the capacitor C20 will charge up to a 15 volt voltage and the diode D14 will then conduct. As the capacitor C20 charges at a slightly slower rate because of the current drained by the conducting diode D14, less current flows from the resistor R19 through diode D15 and more flows through diode D14. Before diode D14 is back biased, the voltage rises above the positive going threshold of the emitter coupled binary transistors Q9 and Q10 whereby the transistor Q9 is again turned off and the transistor Q10 again conducts. The reconduction of the transistor Q9 turns on the transistor Q11 and provides a fast discharge of the capacitor C20 through the diode D16; diode D15 then is suddenly biased off back to its stable state. It should be noted that even if a fault transient condition lasted for a long time due to a long type constant transient the fault condition as seen by the circuit arrangement corresponding to the transistor Q7 on and the transistor Q8 off is limited in its duration because of the capacitive coupling of the capacitor C18. When transistor Q11 is non-conducting (trip condition), the combination of the Zener diodes ZD2 and the resistor R31 keeps the transistor Q12 from conducting. It will be apparent that when the transistor Q12 is not conducting the trip network 68 will be energized for actuating the breaker actuated thereby (not shown).

What is claimed and is desired to be secured by United States Letters Patent is as follows:

1. A control device for detecting changes in the sine wave of an alternating electrical signal, a pair of input terminals adapted to be supplied with said alternating potential signal, a summing network having an output and an input, a differentiating network having an input connected to said input terminals and having an output connected to said input of said summing network, said differentiating network including a multiplying means effective to multiply the magnitude of the differentiated quantity of the sine wave signal supplied to its said input by a predetermined constant differentiating multiplier an integrating network having an input connected to said input terminals and having an output connected to said input of said summing network, said integrating network including multiplying means effective to multiply the magnitude of the integrated quantity of the sine wave signal supplied to its said input by a predetermined constant integrating multiplier, the ratio of said integrating multiplier to said differentiating multiplier being equal to $\omega^2$ where $\omega$ equal 2 $\pi$ hertz based on the hertz of said sine wave signal at said input terminals, and actuated means coupled to said output of said summing network and actuated by said summing network as a consequence of a change in the magnitude of the sum of the signals applied thereto by said differentiating network and said integrating network.

2. The combination of claim 1 in which said actuated means is coupled to said summing network through a transient detector clamping network, said clamping network including first and second connections interconnected by an energy storage device, said clamping network further including potential supply means coupled to said second connection of said clamping network to supply energy to said one connection when the potential at said first connection of said clamping network changes potential in a first direction.

3. The combination of claim 1 which includes a differential amplifier having an input connected to said summing network output and having first and second output terminals, said amplifier being effective in response to an increase in the potential at its said input to increase the potential of its said first output terminal and to decrease the potential of its said second output terminal, said amplifier being effective in response to a decrease in the potential at its said input to decrease the potential of its said first output terminal and to increase the potential of its said second output terminal, first and second capacitors, a plurality of current conducting voltage establishing devices, first circuit means connecting said first capacitor between a first of said establishing devices and said first amplifier output terminal and said first establishing device to said actuated means, second circuit means connecting said second capacitor between a second of said establishing devices and said second amplifier output terminal and said second establishing device to said actuated means, means connecting a source of constant potential to said first circuit means intermediate said first capacitor and said first establishing device and including a third of said establishing devices, means connecting said source of potential to said second circuit means intermediate said second capacitor and said second establishing device and including a fourth of said establishing devices.

4. The combination of claim 3 in which said first and second establishing devices are asymmetric current conducting devices.

5. The combination of claim 4 in which said first and second establishing devices have a common connection to said actuated means, said third and fourth establishing devices are symmetric current conducting devices and there is provided a fifth symmetric current conducting device connected between said source of potential and said common connection of said first and second establishing devices to said actuated means.

6. The combination of claim 3 in which said third and fourth establishing devices are asymmetric current conducting devices.

7. The combination of claim 6 in which said first and second establishing devices are symmetric current conducting devices.

8. In combination an input circuit adapted to be energized with an alternating potential sine wave input signal, first and second computing networks having input and output terminals, said first network including a first amplifier and circuitry connecting said amplifier between its said input and its said output terminals whereby said first network is effective to perform an integrating operation on an alternating potential supplied to its said input terminal and supply the integrated result to its said output terminal, said second network including a second amplifier and circuitry connecting said second amplifier between its said input and its said output terminals whereby said second network is effective to perform a differentiating operation on an alternating potential quantity supplied to its said input terminal and supply the differentiated result to its said output terminal, said first network including first multiplying means for multiplying the true integrated value of said signal by a first constant, said second network including second multiplying means for multiplying the true differentiated value of said signal by a second constant, said constants being so related that when there is no discontinuity in the sine wave of said signal the magnitudes of said results are of equal magnitude, means connecting said input terminals to said input circuit for energization of said first and second networks by said signal, a summing network connected between said output terminals and having an output terminal, said summing network being effective to combine said results at said output terminals such that the resultant output signal at said output terminal of said summing network is substantially zero when said input signal takes the shape of a sine wave and to provide an output signal at said output terminal of said summing network as a consequence of a change in the waveform of said signal direct current blocking device, a control terminal, and circuitry connecting said control terminal to said output terminal and effective to energize said control terminal with a constant signal in the presence of said output signal.

9. The combination of claim 8 in which said circuitry provides a undirectional output control signal which has a magnitude dependent upon the magnitude of said output signal and independent of the polarity of said output signal.

10. The combination of claim 8 in which said circuitry clamps the potential of said control signal and comprises a storage device coupled between said output terminal and said control terminal and a charging circuit connecting a source of unidirectional polarity potential to said storage device adjacent said control terminal, and an asymmetric current flow device connected in said charging circuit.

11. The combination of claim 10 in which said storage device is a capacitor and said asymmetric device is a rectifier.

12. The combination of claim 11 in which said input circuit includes a sine wave filter, said filter being tuned to attenuate harmonics of said input signal.

13. A detecting apparatus for detecting a discontinuity in the shape of the sine wave of an applied electrical quantity having an angular frequency $\omega$ comprising first and second computing networks each having an input terminal and an output terminal, each of said networks comprising a high gain amplifier having its output connected to energize said output terminal of the said network with which it is associated and an input connected through an input impedance device to said input terminal of the said network with which it is associated, each said amplifier being provided with a feedback impedance device connected to supply a feedback signal from the said output to the said input of the said amplifier with which it is associated, said feedback impedance device of said first network and said input impedance device of said second network each being primarily resistive in nature, said input impedance device of said first network and said feedback impedance device of said second network being primarily capacitive in nature, the magnitudes of the impedances of said devices being so chosen with respect to the angular frequency of said electrical quantity that the output quantities of said networks are of equal magnitudes when both of said networks are simultaneously energized by said alternating quantity with no discontinuity present in its said sine wave.

14. The combination of claim 13 in which magnitudes are of opposite polarity.

15. The combination of claim 13 in which the product of the resistance values in ohms and the capacitance values in farads is equal to $1/\omega^2$.

* * * * *